United States Patent
Ngo

(10) Patent No.: US 10,875,047 B2
(45) Date of Patent: Dec. 29, 2020

(54) AUTOMATED MASKLESS PAINT APPLICATOR

(71) Applicant: The Boeing Company, Chicago, IL (US)

(72) Inventor: Son N. Ngo, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/425,511

(22) Filed: May 29, 2019

(65) Prior Publication Data

US 2019/0275553 A1 Sep. 12, 2019

Related U.S. Application Data

(62) Division of application No. 15/400,377, filed on Jan. 6, 2017, now Pat. No. 10,343,181.

(51) Int. Cl.
*B05C 1/00* (2006.01)
*B05C 1/06* (2006.01)
(Continued)

(52) U.S. Cl.
CPC ............... *B05C 1/00* (2013.01); *B05C 1/06* (2013.01); *B05D 1/28* (2013.01); *B64F 5/00* (2013.01)

(58) Field of Classification Search
CPC ............... B64F 5/00; B05C 1/00; B05C 1/06
See application file for complete search history.

(56) References Cited

U.S. PATENT DOCUMENTS

| 4,661,368 A | 4/1987 | Rohde et al. |
| 5,131,349 A * | 7/1992 | Keller ...................... B05C 1/06 |
| | | 118/73 |

(Continued)

FOREIGN PATENT DOCUMENTS

| EP | 3156138 A1 | 4/2017 |
| JP | H05115825 A | 5/1993 |

(Continued)

OTHER PUBLICATIONS

U.S. Appl. No. 14/885,408 entitled "Maskless Paining End Effector Tool for Robotic Painting Applications".

(Continued)

*Primary Examiner* — Cachet I Proctor
(74) *Attorney, Agent, or Firm* — Miller, Matthias & Hull LLP

(57) ABSTRACT

An applicator assembly for treating a surface includes a material applicator configured to dispense a treatment material on a surface and an applicator clamp configured to support and position a dispensing end of the material applicator. An applicator tip is inserted into a dispensing aperture formed in the applicator clamp, and the applicator tip is configured to receive the treatment material from the dispensing end of the material applicator. The applicator assembly further includes an applicator bracket configured to slidably attach the material applicator and applicator clamp to an assembly support frame. Additionally, an automated applicator actuator operatively attached to the assembly support frame and applicator bracket manipulates the applicator bracket between a first position and a second position.

20 Claims, 6 Drawing Sheets

(51) Int. Cl.
   *B05D 1/28*   (2006.01)
   *B64F 5/00*   (2017.01)

(56) References Cited

U.S. PATENT DOCUMENTS

| | | | | |
|---|---|---|---|---|
| 5,429,682 | A * | 7/1995 | Harlow, Jr. | B05B 7/0815 |
| | | | | 118/316 |
| 6,234,358 | B1 * | 5/2001 | Romine | B23K 3/0607 |
| | | | | 222/181.3 |
| 6,471,774 | B1 * | 10/2002 | Krueger | B05C 1/06 |
| | | | | 118/264 |
| 8,088,450 | B2 * | 1/2012 | Swanberg | B05B 13/005 |
| | | | | 427/402 |
| 8,455,054 | B2 * | 6/2013 | Brewer | B05B 13/005 |
| | | | | 427/402 |
| 9,346,074 | B2 * | 5/2016 | Hogan | B05C 5/0225 |
| 10,343,181 | B2 * | 7/2019 | Ngo | B05C 1/06 |
| 2002/0112664 | A1 * | 8/2002 | Johnson | B05C 5/0208 |
| | | | | 118/264 |
| 2005/0056213 | A1 * | 3/2005 | Iimori | B05C 5/0216 |
| | | | | 118/410 |
| 2005/0269375 | A1 * | 12/2005 | Ahn | B05C 5/0216 |
| | | | | 222/504 |
| 2007/0016328 | A1 * | 1/2007 | Ziegler | A47L 5/14 |
| | | | | 700/245 |
| 2008/0105703 | A1 * | 5/2008 | Prentice | B05C 5/0225 |
| | | | | 222/63 |
| 2009/0317554 | A1 * | 12/2009 | Christensen | B05B 13/0431 |
| | | | | 427/427.2 |
| 2015/0342077 | A1 * | 11/2015 | Dalal | H05K 7/06 |
| | | | | 361/760 |
| 2016/0158940 | A1 * | 6/2016 | Brockway | B25J 9/1687 |
| | | | | 700/114 |
| 2017/0106393 | A1 * | 4/2017 | Hampson | B05C 1/06 |

FOREIGN PATENT DOCUMENTS

| | | |
|---|---|---|
| JP | H08257466 A | 10/1996 |
| WO | 0067915 A1 | 11/2000 |

OTHER PUBLICATIONS

Nordson Asymtekl; Select Coat® SC-280 Film Coater Precise Non-Atomized Conformal Coating Application; brochure; Aug. 8, 2016; pp. 1-3; http://www.nordson.com/en/divisions/asymtek/products/applicators/select-coat-sc-280n-sc-280c-film-coater-applicator.

Search Report for related European Application No. 17195029.8; Report dated Apr. 9, 2018.

\* cited by examiner

AUTOMATED MASKLESS PAINT APPLICATOR

FIELD

The present disclosure relates generally to surface treatment systems, and more specifically to automated maskless surface treatment systems for painting surfaces.

BACKGROUND

Treating and coating structural surfaces of machines, such as commercial aircraft, is a long and extensive process. Surface treatment often requires coating a structural surface that includes a variety of geometries such as flat, concave, convex, and other such shaped surfaces. Furthermore, coating the structural surfaces includes applying multiple layers of coatings for engineering properties, as well as to apply a decorative livery. Often times, each subsequent layer or coating is applied using a complex process which requires a series of masking operations performed before applying a variety of colored paints or other coatings where they are needed. For example, when shapes or text are to be painted on the surface, the shape or text is manually masked before painting over and/or around the mask(s). Moreover, each layer or coating must cure, or sufficiently dry, before the next layer can be applied. The cure time can last up to several hours, and therefore adds significant time to the overall surface treatment process. These masking, painting, and curing operations are serially repeated until the exterior surface treatment is completed. Performing these processes on large areas with a variety of contoured surfaces, therefore, can require a significant amount of time and resources.

SUMMARY

In accordance with one aspect of the present disclosure, an applicator assembly is disclosed. The applicator assembly includes an assembly support frame and a material applicator configured to dispense a treatment material on a surface. The applicator assembly further includes an applicator clamp forming an interior space and having a dispensing aperture. The applicator clamp is configured to support and position a dispensing end of the material applicator within the interior space. The applicator assembly further includes an applicator tip inserted into the dispensing aperture formed in the applicator clamp. The applicator tip extends from the interior space to a location exterior of the applicator clamp and the applicator tip is configured to receive the treatment material from the dispensing end of the material applicator. The applicator assembly further includes an applicator bracket attached to the material applicator and the applicator clamp, the applicator bracket configured to slidably attach the material applicator and the applicator clamp to the assembly support frame. An automated applicator actuator is operatively attached to the assembly support frame and the applicator bracket, the automated applicator actuator configured to manipulate the applicator bracket between a first position and a second position.

In accordance with another aspect of the present disclosure, surface treatment system for applying a treatment material to a surface is disclosed. The surface treatment system includes an applicator assembly configured to treat the surface with the treatment material and the applicator assembly includes an assembly support frame and a material applicator configured to dispense the treatment material on the surface. The applicator assembly further includes an applicator clamp forming an interior space and having a dispensing aperture. The applicator clamp is configured to support and position a dispensing end of the material applicator within the interior space. Additionally, an applicator tip is inserted into the dispensing aperture formed in the applicator clamp and the applicator tip extends from the interior space to a location exterior of the applicator clamp. The applicator tip is configured to receive the treatment material from the dispensing end of the material applicator. The applicator assembly further includes an applicator bracket attached to the material applicator and the applicator clamp. The applicator bracket is configured to slidably attach the material applicator and the applicator bracket to the assembly support frame. Furthermore, an automated applicator actuator is operatively attached to the assembly support frame and the applicator bracket and the automated applicator actuator is configured to manipulate the applicator bracket, the material applicator, and the applicator clamp between a first position and a second position. The surface treatment system further includes a pressure vessel configured to hold the treatment material and the pressure vessel is coupled to a material supply line which extends from the pressure vessel to the material applicator. The material supply line is configured to supply the treatment material to the material applicator, wherein, the pressure vessel is coupled to the material supply line. The surface treatment system further includes a robot arm operably attached to the assembly support frame and configured to move and position the applicator assembly during treatment of the surface. Moreover, at least one sensor is operatively attached to the applicator assembly and configured to sense and scan the surface to produce a surface data set. Moreover, the surface treatment system includes a controller communicably coupled to the applicator assembly and programmed to operate the automated applicator actuator to manipulate the applicator assembly between at least the first position and the second position, and to selectively operate the material applicator such that the treatment material is applied to the surface.

In accordance with yet another aspect of the present disclosure, a method of treating a surface with a surface treatment system is disclosed. The surface treatment method includes determining a treatment start position of a robot arm for applying a treatment material to the surface, wherein an applicator assembly is attached to the robot arm. The method further includes moving the robot arm to the treatment start position and aligning the applicator assembly with the surface. Additionally, the method includes saturating an applicator tip of the applicator assembly with a material applicator configured to dispense the treatment material. Moreover, the method includes manipulating the applicator assembly between a first position and a second position with an automated applicator actuator to position the applicator assembly relative to the surface. The method further includes selectively operating the applicator assembly to apply the treatment material to the surface.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated diagrammatically, schematically, and in some cases in partial views. In certain instances, details which are not necessary for an understanding of the disclosed methods and apparatuses or which render other details difficult to perceive may have been omitted. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide the description of an automated surface treatment (e.g., painting) system and methods for treating a surface using the automated surface treatment system. In one non-limiting example, the automated surface treatment system can be used to at least eliminate the masking step which covers portions of the surface not to be treated (e.g., painted). Additionally, the automated surface treatment system can increase the quality of the surface treatment because the manual masking step is removed. Furthermore, removing the manual masking process can reduce the surface treatment time because the treatment method no longer needs to wait for a previously applied paint coat to be completely cured before the manual masking step. Actual scope of the disclosure is defined by the appended claims.

Figure 1:
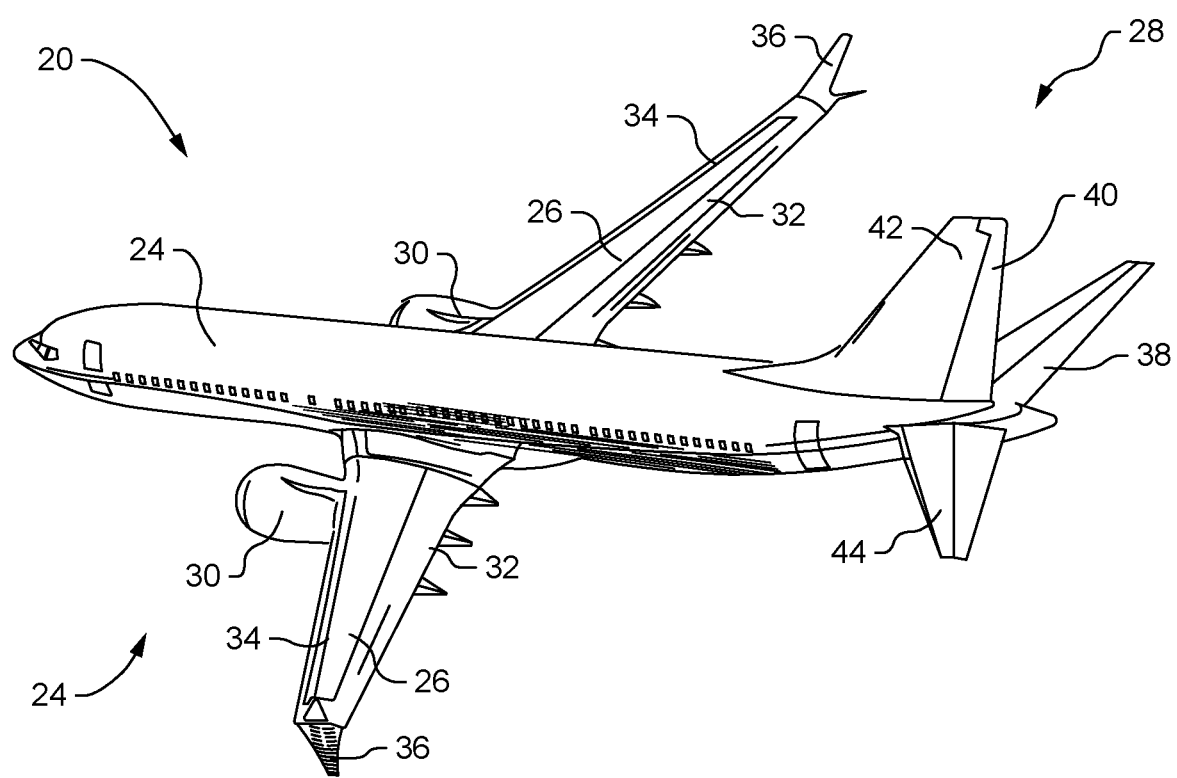
FIG. 1 is a perspective view of an exemplary vehicle constructed in accordance with the present disclosure.

Referring to FIG. 1, an assembled vehicle 20 is illustrated. One non-limiting example of the vehicle 20 is that of an aircraft; however the present disclosure applies to other types of vehicles and machines as well. As illustrated, the vehicle 20 is configured with an airframe 22 which includes a fuselage 24, wings 26, and a tail section 28. In some embodiments, one or more propulsion units 30 are attached to each wing 26 in order to propel the vehicle 20 in a direction of travel. Furthermore, the wings 26 are fixedly attached to the fuselage 24 and the propulsion units 30 are attached to an underside surface of the wing 26, however other attachment locations of the propulsion units 30 are possible. In some embodiments, the wings 26 are positioned at a substantially centered position along the fuselage 24, and the wings 26 are configured to include a plurality of flaps 32, leading edge devices 34, and peripheral edge devices 36 (i.e., winglets). Moreover, during operation of the vehicle 20, the flaps 32, leading edge devices 34 and peripheral edge devices 36 are capable of being adjusted in a plurality of positions in order to control and stabilize the vehicle 20. For example, the flaps 32 and leading edge devices 34 are adjustable in several different positions to produce the desired lift characteristics of the wings 26. Additionally, the tail section 28 of the airframe 22 includes components which provide other stability and maneuverability functions of the vehicle 20, such as an elevator 38, a rudder 40, a vertical stabilizer fin 42, and a horizontal stabilizer 44.

Figure 2:
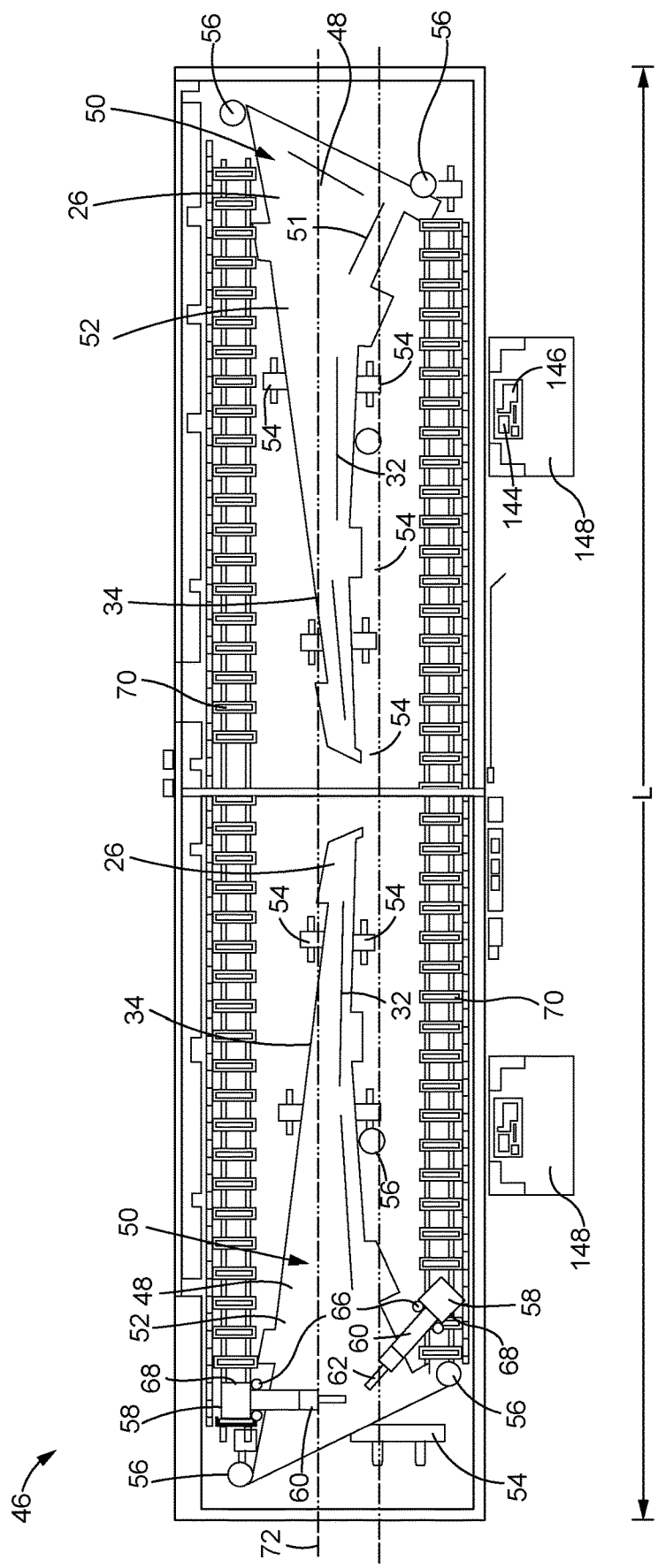
FIG. 2 is a top view of an exemplary work area including a set of wings and an automated robot assembly in accordance with the present disclosure.

FIG. 2 illustrates one non-limiting example of the wings 26 positioned within a work area 46 and disassembled from other components of the vehicle 20. Generally, the wings 26 and other components of the vehicle 20 (FIG. 1) are constructed out of aluminum, aluminum alloy, titanium, carbon composite, or other suitable material. Moreover, the wings 26 are configured to form an aerodynamic structure which incorporates a variety of surface geometries such as, but not limited to, flat surfaces, concave surfaces, convex surfaces, and other such surface geometries. In some embodiments, the variety of surface geometries (i.e., flat, curved, concave, convex) are used in combination to form the wings 26, and therefore create changing dimensions, topographies, and other such characteristics along the length, width, or other such dimension of the wings 26. In one non-limiting example, a wing surface 50 (i.e., top and bottom surfaces of the wing 26) has a portion that forms flat surface 48. Moreover, the leading edge devices 34 of the wing 26 create a more rounded or curved surface 52 of the wing 26, and other portions of the wing surface 50 have a variable topography (i.e., convex and concave). Additionally, it will be understood that while the wings 26 are illustrated in FIG. 2, embodiments of the present disclosure apply to other components and systems of the vehicle 20 as well.

During manufacturing and/or servicing of the vehicle 20 (FIG. 1), the wings 26, and other components, are not assembled with or detached from the fuselage 24 (FIG. 1) and positioned within the work area 46 to perform one or more manufacturing or scheduled service steps. In one non-limiting example, the manufacturing and/or servicing of the vehicle 20 includes providing one or more surface treatments on the wing surface 50. Generally, the surface treatment of the wing surface 50 includes one or more of cleaning, abrading, priming, painting, protecting, repairing, or other surface treatment of the flat surface 48, the curved surface 52, and other portions of each wing 26. Moreover, one non-limiting example of applying a surface treatment layer 51 (i.e., paint, primer, clear coat) to the wing surface 50 includes applying straight lines, curved lines, graphical patterns, and text descriptions (i.e., "No Step", "Hot", "Caution") to alert or communicate certain instructions regarding the wings 26 or other components of the vehicle 20 (FIG. 1). Additionally or alternatively, the surface treatment layer 51 provides surface protection against the harsh environmental conditions encountered by the wings 26 during operation, and the lines, graphical patterns, or text descriptions help identify and distinguish particular (e.g., sensitive) portions of the wings 26 and other components of the vehicle 20 (FIG. 1).

As further illustrated in FIG. 2, each wing 26 is prepared for applying the surface treatment layer 51 by positioning the wing 26 within the work area 46 prior to coupling the wings 26 and other components together to form the vehicle 20 (FIG. 1). However, in alternative embodiments, such as, but not limited to, during service or maintenance of the vehicle 20 (FIG. 1), applying the surface treatment layer 51 is possible with the wings 26, the tail section 28 (FIG. 1), and other components attached to the fuselage 24 (FIG. 1). As further illustrated in FIG. 2, in an embodiment where the wings 26 are unattached to the fuselage 24 (FIG. 1), each wing 26 is delivered to the work area 46 by a plurality of automated guided vehicles 54 (AGVs) or other such movement device. For example, the AGVs 54 are positioned along the underside of the each wing 26 and provide adequate support while the AGVs 54 move the wings 26 into treatment position, as well as support each wing 26 during surface treatment. In some embodiments, after the AGVs 54 move the wings 26 into the work area 46, one or more wing support structures 56 are positioned along the underside of each wing 26 to provide additional support during the surface treatment. While the use of AGVs 54 and wing support structures 56 are shown in FIG. 2, the use of other movement and support devices such as a gantry, a conveyor system, and the like are also possible.

Additionally, the work area 46 is equipped with at least one automated robot assembly 58 that includes a robot arm 60 and an applicator assembly 62 operably attached to the robot arm 60. In some embodiments, the applicator assembly 62 is configured to apply a treatment material 64, such as, but not limited to, a primer, a base coat paint, a top coat paint, a clear coat, or other such material, to the wing surface 50 of the vehicle 20 (FIG. 1). Additionally, the robot arm 60 is configured as an articulated device with at least one robot arm joint 66 which allows for the manipulation and adjustment of the robot arm 60 during application of the treatment material 64. Furthermore, in one non-limiting example, the automated robot assembly 58 and applicator assembly 62 are mounted on a surface treatment AGV 68, similar to the AGVs 54 used to move the wings 26 in and out of the work area 46. The surface treatment AGV 68 is configured to move along the length L-L of the work area 46 as the automated robot assembly 58 and applicator assembly 62 treat the wing surface 50. In one embodiment, the surface treatment AGV 68 is attached to a set of AGV rails 70, which are positioned laterally along the wing 26 and configured to run along the length L-L of the work area 46. Furthermore, some embodiments include at least two sets of the AGV rails 70 that are spaced apart within the work area 46 such that the wings 26, or other components, are positioned and substantially centered between the two sets of AGV rails 70. As a result, one or more automated robot assemblies 58 and applicator assemblies 62 are positioned on either side of the wing 26 during treatment of the wing surface 50. In an alternative embodiment, the surface treatment AGV 68 is configured with a set of ground engaging elements (i.e., tracks, or wheels) that do not require being mounted on a set of AGV rails 70. Such a surface treatment AGV 68 travels directly along the floor of the work area 46 while the automated robot assembly 58 and applicator assembly 62 applies the treatment material 64 along the wing surface 50.

In an alternative embodiment, instead of using the surface treatment AGV 68, the automated robot assembly 58 and applicator assembly 62 are mounted on an overhead gantry 72 positioned above the wings 26. In some embodiments, the automated robot assembly 58 is operably attached to the overhead gantry 72 such that the automated robot assembly 58 hangs down from the overhead gantry 72 and the robot arm 60 and applicator assembly 62 are manipulated and adjusted to apply the treatment material 64 to the wing surface 50.

Figure 3:
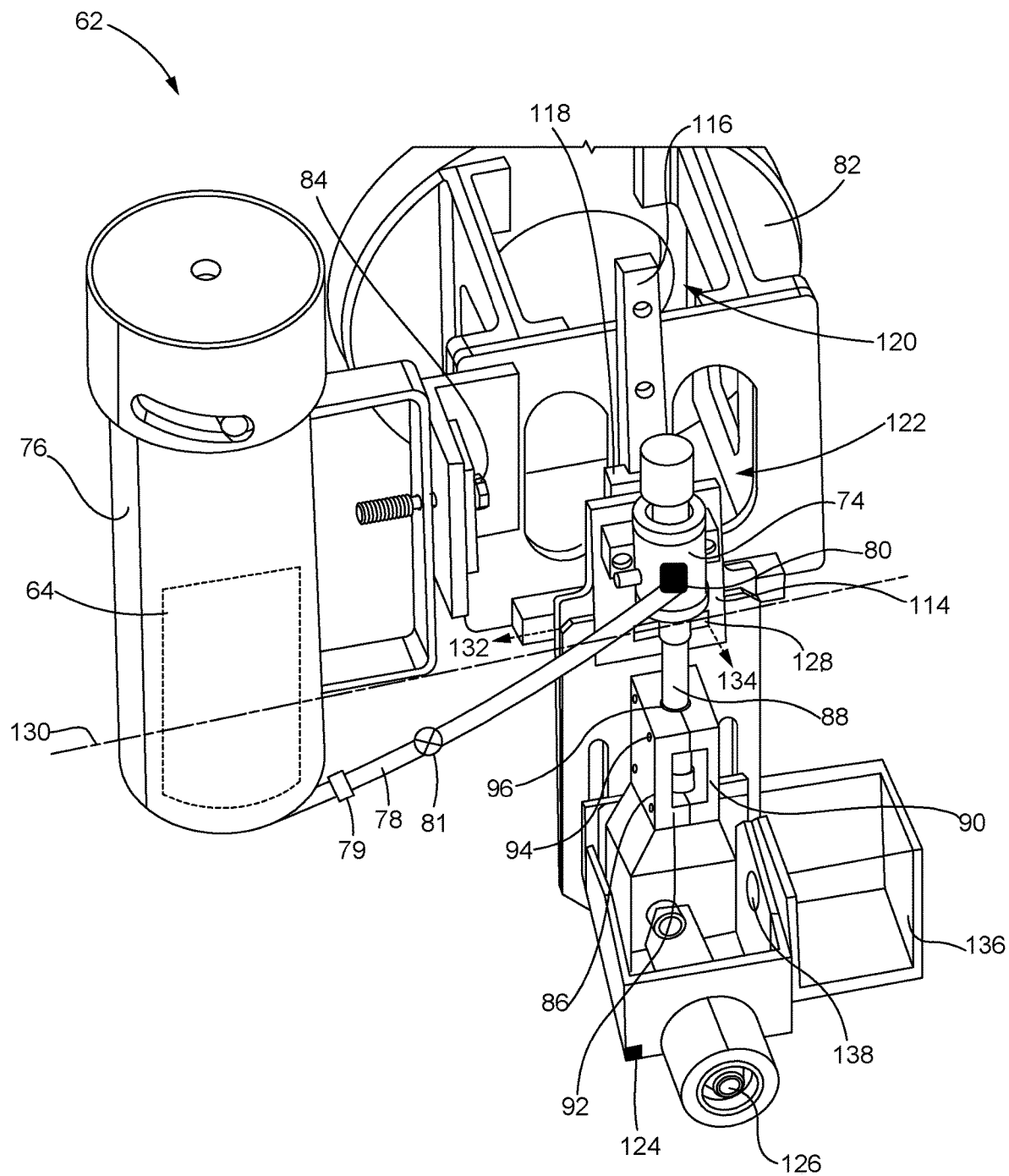
FIG. 3 is a perspective view of an exemplary applicator assembly attached to the automated robot assembly of FIG. 2, in accordance with the present disclosure.
Figure 4:
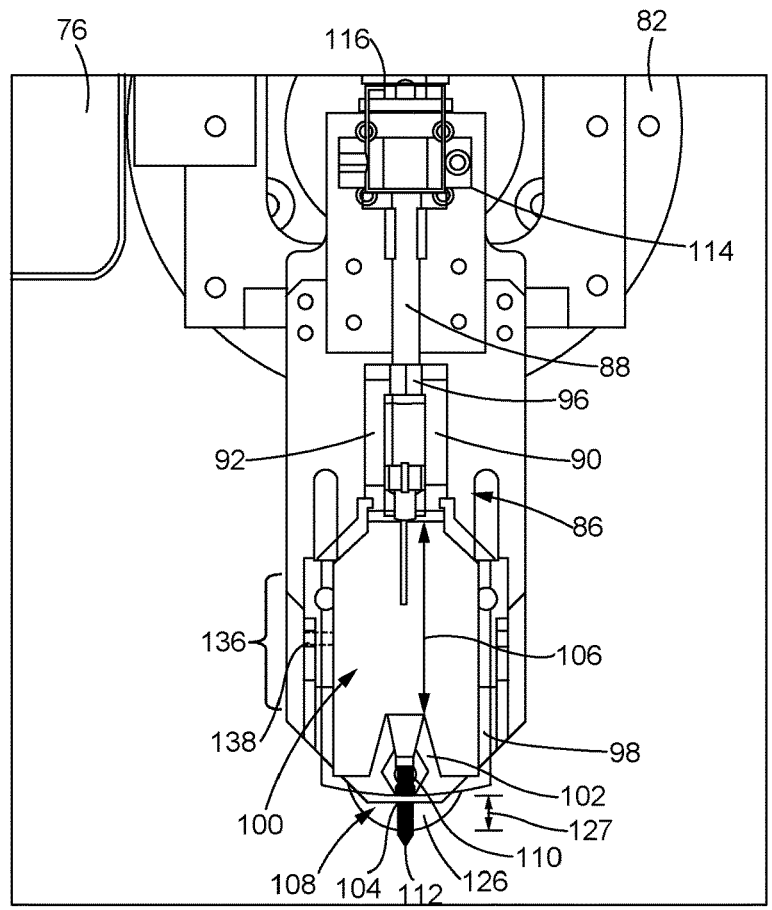
FIG. 4 is a sectional view of the applicator assembly of FIG. 3, in accordance with the present disclosure.

Referring now to FIGS. 3 and 4, with continued reference to FIG. 2, an exemplary applicator assembly 62 is shown. In some embodiments, the applicator assembly 62 includes a material applicator 74 that is configured to dispense the treatment material 64 onto the wing surface 50 or other such location of the vehicle 20. (FIG. 1). In one non-limiting example, the material applicator 74 is a pneumatic film and material coater that does not spray or otherwise atomize the material into droplets as the material is applied to the surface. Additionally, the material applicator 74 being configured as a pneumatic film and material coater can eliminate over spray that occurs with a spray or atomized material deposition. As a result, the material applicator 74 can provide several benefits such as, but not limited to, eliminating the need to mask the surrounding area, reducing ventilation requirements around the work area 46, and reducing wasted treatment material 64.

In one non-limiting example, the applicator assembly 62 includes a pressure vessel 76 configured to store and pressurize a supply of the treatment material 64. Generally, the pressure vessel 76 is configured to have a pressurized range between 5 to 20 pounds per square inch (psi) (34.5 to 137.9 kilopascal (kPa)); however other pressure ranges for the pressure vessel 76 and treatment material 64 are possible. Moreover, the pressure vessel 76 is coupled, or otherwise connected, to the material applicator 74 through a material supply line 78 which transfers the treatment material 64 from the pressure vessel 76 to the material applicator 74. In FIG. 3, one non-limiting example of the applicator assembly 62 illustrates the material supply line 78 to include a flow restrictor 79, such as, but not limited to, a needle valve, a mass flow controller, or other such flow limiting device. The flow restrictor 79 can be adjusted to control the flow rate of the treatment material 64 between the pressure vessel 76 and the material applicator 74.

Additionally, in some embodiments the material applicator 74, or other component of the applicator assembly 62, further includes a treatment material control valve 80 that is selectively opened or closed to allow the treatment material 64 to flow, or otherwise be transferred, from the pressure vessel 76 to the material applicator 74. For example, FIG. 3 shows the material applicator 74 configured with the treatment material control valve 80 coupled to a first end of the material supply line 78. As a result, selectively opening the treatment material control valve 80 allows the treatment material 64, stored under pressure in the pressure vessel 76, to flow through the material supply line 78 from the pressure vessel 76 to the material applicator 74. Furthermore, in one non-limiting example the applicator assembly 62 is configured to include both the flow restrictor 79 and the treatment material control valve 80 to adjust and control the flow of the treatment material 64 between the pressure vessel 76 and the material applicator 74. However, other configurations of the components of the applicator assembly 62 are possible. In an alternative embodiment, the treatment material control valve 80 can be incorporated with the pressure vessel 76 and/or the material supply line 78. Additionally, in yet an alternative embodiment, each of the material applicator 74 and the pressure vessel 76 are configured with a treatment material control valve 80 that is selectively opened and closed to control the movement of the treatment material 64 between the pressure vessel 76 and the material applicator 74.

In some embodiments, a pump 81 can be additionally incorporated with the applicator assembly 62 and coupled to the material supply line 78. The pump 81 can be configured to pump the treatment material 64 between the pressure vessel 76 and the applicator assembly 62. Generally, the pump 81 is a low pressure pump, such as but not limited to, a peristaltic pump, a pneumatic pump, a diaphragm pump, a centrifugal pump, or other low pressure pump. Moreover, the pump 81 is configured to deliver a low enough flow rate (i.e., as low as 1 ml/min) of treatment material 64 such that the pump 81 can remain in an actively pumping state during the application of the treatment material 64. For example, the pump 81 can be configured to produce a continuous flow of treatment material 64 from the pressure vessel 76 to the applicator assembly 62. Additionally, the flow restrictor 79 and/or the treatment material control valve 80 can be used with the pump 81 to adjust and control the flow of the treatment material 64 from the pressure vessel 76 to the applicator assembly 62 during the application of the treatment material 64 on the wing surface 50 (FIG. 2).

As further illustrated in FIGS. 3 and 4, an embodiment of the applicator assembly 62 includes an assembly support frame 82 configured to attach the applicator assembly 62 to the automated robot assembly 58 (FIG. 2). Moreover, in some embodiments, the pressure vessel 76 is mounted or otherwise attached to the assembly support frame 82 with one or more vessel fasteners 84 such as a screw, bolt, pin, or other such device. Additionally, the applicator assembly 62 includes an applicator clamp 86 configured to support and position a dispensing end 88 of the material applicator 74. In one non-limiting example, the applicator clamp 86 is formed from a first piece 90 and a second piece 92 that fit together and fastened by one or more clamp fasteners 94 such as, but not limited to, a screw, bolt, pin, or other such device. Furthermore, the first and second pieces 90, 92 of the applicator clamp 86 are configured to form an applicator aperture 96 such that the dispensing end 88 of the material applicator 74 extends into and is secured by the applicator clamp 86. Additionally, in some embodiments, the applicator clamp 86 includes a third piece 98 (FIG. 4), which is attached to the first and second pieces 90, 92 and is configured to define an interior space 100 (FIG. 4) of the applicator clamp 86. In an alternative embodiment, the applicator clamp 86 can be formed from a single unitary piece.

Furthermore, the applicator clamp 86 is configured such that the dispensing end 88 is inserted through the applicator aperture 96 and extends into the interior space 100 of the applicator clamp 86. Moreover, as further illustrated in FIG. 4, the applicator clamp 86 includes a raised lip 102 and dispensing aperture 104. In one non-limiting example, the applicator aperture 96 and dispensing aperture 104 are aligned with one another and formed in opposing ends of the applicator clamp 86. However, other configurations of the applicator aperture 96 and dispensing aperture 104 are possible. In some embodiments, the dispensing aperture 104 extends from the interior space 100 of the applicator clamp 86 to the exterior such that treatment material 64 dispensed by the material applicator 74 is applied to the wing surface 50 (FIG. 2) or other desired application location on the vehicle 20 (FIG. 1). Additionally, in an embodiment, the raised lip 102 is configured to circumferentially surround the dispensing aperture 104 within the interior space 100 such that any excess treatment material 64 is retained within the interior space 100 of the applicator clamp 86 and not allowed to be dispensed through the dispensing aperture 104. As further illustrated in FIG. 4, in some embodiments, the dispensing end 88 of the material applicator 74 is positioned a distance 106 away from the raised lip 102 surrounding the dispensing aperture 104. Moreover, the applicator clamp 86 is configured such that the position of the dispensing end 88 of the material applicator 74 is adjustable in order to change (i.e., increase or decrease) the distance 106 between the dispensing end 88 and the raised lip 102. For example, the distance 106 between the dispensing end 88 of the material applicator 74 and the raised lip 102 surrounding the dispensing aperture 104 is adjusted (i.e., increased or decreased) in order to optimize the dispensing of the treatment material 64 by the applicator assembly 62.

Furthermore, an embodiment of the applicator clamp 86 includes an applicator tip 108 that is inserted into the dispensing aperture 104. The applicator tip 108 is positioned within the dispensing aperture 104 such that the applicator tip 108 extends from the interior space 100 through the dispensing aperture 104 to the exterior of the applicator clamp 86. In some embodiments, the applicator tip 108 is formed out of an absorbent foam material to provide a distinct (i.e., sharp) edge along a line of treatment material 64 dispensed on the wing surface 50. However, the applicator tip 108 can be formed out of an alternative absorbent material such as, but not limited to, a polymer, a fibrous brush, cloth, or other absorbent material. Moreover, the interior portion 110 of the applicator tip 108 extends through the dispensing aperture 104 and into the interior space 100 of the applicator clamp 86, and the interior portion 110 of the applicator tip 108 is aligned with the dispensing end 88 of the material applicator 74. Moreover, the interior portion 110 of the applicator tip 108 is surrounded by the raised lip 102. As a result, the material applicator 74 dispenses the treatment material 64 such that the interior portion 110 of the applicator tip 108 absorbs and becomes saturated with the dispensed treatment material 64. Additionally, the applicator tip 108 includes an exterior portion 112 that is adjacently positioned, or in some cases in direct contact with, the wing surface 50 (FIG. 2), and configured to apply and distribute the treatment material 64 along the wing surface 50 (FIG. 2) or other such desired surface to be treated. In one non-limiting example, the exterior portion 112 of the applicator tip 108 is configured to continuously and smoothly apply a linear pattern of treatment material 64 along the wing surface 50. However, other shapes and configurations of the exterior portion 112 of the applicator tip 108 are possible, depending on the application needs.

Further illustrated in FIGS. 3-4, an exemplary embodiment of the applicator assembly 62 includes an applicator bracket 114 that is attached to the material applicator 74 and the applicator clamp 86. Moreover, the applicator bracket 114 is mounted or otherwise attached to the assembly support frame 82. In one non-limiting example, the assembly support frame 82 includes an actuation rail 116, or other actuation guiding device, and the applicator bracket 114 is slidably attached to the actuation rail 116. In one non-limiting example, the actuation rail 116 is configured in a vertical orientation, and the applicator bracket 114 is attached to the actuation rail 116 such that the material applicator 74, the applicator clamp 86, and the applicator tip 108 are raised and lowered as the applicator bracket 114 slides along the actuation rail 116. As a result, applicator bracket 114 slides along the actuation rail 116 in a first direction to engage or adjacently position the applicator tip 108 with the wing surface 50, or other surface to be treated. Alternatively, the applicator bracket 114 slides along the actuation rail 116 in an opposite second direction to disengage or raise the applicator tip 108 away from the wing surface 50. Moreover, in some embodiments, an applicator actuator 118 is attached to the assembly support frame 82 and the applicator bracket 114 and the applicator actuator 118 is configured to actuate the applicator bracket 114 between at least a first position 120 (i.e., raised position) and a second position 122 (i.e., lowered position).

Referring back to FIG. 3, an embodiment of the applicator assembly 62 is configured with at least one sensor 124 operatively attached to the applicator clamp 86 or other component of the applicator assembly 62. In one non-limiting example, the one or more sensors 124 include a sensing device, such as, but not limited to, a vision sensor (i.e., camera), a laser scanning topography and surface height sense sensor (i.e., laser, LIDAR, and/or interferometer), and other such surface metrology sensors. The sensor 124 is configured to scan and sense the wing surface 50 (FIG. 2) and collect or otherwise produce a surface data set which includes the gap or distance measured between the applicator clamp 86, or other component of the applicator assembly 62, and the wing surface 50. Furthermore, some embodiments of the applicator assembly 62, include one or more surface engaging members 126, such as wheels, that engage the wing surface 50, when the applicator assembly 62 is adjusted in the second position 122 (i.e., lowered position).

Moreover, the one or more surface engaging members 126 are positioned, or otherwise mounted, on the applicator assembly 62 to define a contact point at a fixed height relative to the applicator tip 108 and the wing surface 50 (FIG. 2). For example, the one or more surface engaging members 126 can be sized and/or mounted on the applicator assembly 62 such that a pre-defined distance 127 (FIG. 4) is maintained between the applicator assembly 62 and the wing surface 50. As a result, when the one or more surface engaging members 126 engage the wing surface 50 the applicator tip 108 contacts the wing surface 50, and the applicator tip 108 remains in constant contact with the wing surface 50 as the automated robot assembly 58 and the applicator assembly 62 move on the wing surface 50. Additionally, the surface engaging members 126 are configured to allow the applicator assembly 62 to adapt to any changing geometry (i.e., curvature or steps) of the wing surface 50 such that the applicator assembly 62 and the applicator tip 108 maintain contact with the wing surface 50 as the applicator assembly 62 moves along the wing surface 50 (FIG. 2) or other such surface to be treated.

Moreover, some embodiments of the applicator assembly 62 are further configured to include a pivot joint 128 located between the applicator bracket 114 and the assembly support frame 82. In some embodiments, the applicator actuator 118 is additionally configured to rotate the applicator bracket 114 about an axis 130 of the pivot joint 128 such that the applicator assembly 62 maintains the desired orientation relative to the wing surface 50 (FIG. 2) or other such surface to be treated. Additionally, in some embodiments, the pivot joint 128 is further configured to rotate the applicator bracket 114, as well as the attached material applicator 74 and applicator clamp 86, between a pivot joint first position 132 (i.e., treatment position) and a pivot joint second position 134 (i.e., treatment material empty position). In an embodiment, the applicator assembly 62 further includes a material chamber 136 attached to the exterior of the applicator clamp 86 and an excess material aperture 138 is formed in the applicator clamp 86. The material chamber 136 is aligned with the excess material aperture 138 such that as the pivot joint 128 rotates the applicator bracket 114 from the first position 120 to the second position 122 any excess treatment material 64 in the interior space 100 empties into the material chamber 136 through the excess material aperture 138. In one non-limiting example, the applicator bracket 114 rotates approximately ninety degrees as the pivot joint 128 rotates between the first position 120 and the second position 122. However other rotation amounts to rotate the applicator bracket 114 are possible in order to empty the excess treatment material 64 into the material chamber 136.

Referring back to FIG. 2, automated robot assembly 58 and the applicator assembly 62 apply the treatment material 64 along the wing surface 50 or other desired surface to be treated. In one embodiment, the automated robot assembly 58 and the applicator assembly 62 apply the treatment material 64 in a straight line, a curved line, or other defined pattern or geometry, as the surface treatment AGV 68, or other such device, moves the automated robot assembly 58 and the applicator assembly 62 along the wing surface 50.

The applicator assembly 62 is capable of being configured to apply a plurality of coatings which, either alone or in combination, compose the surface treatment layer 51. For example, the applicator assembly 62 is capable of applying a plurality of surface coatings, such as, but not limited to, a surface protective layer, an adhesion promoting layer, a primer layer, a basecoat layer, a top coat layer, a clear coat layer, a decorative livery coating, or other known coatings. Moreover, the applicator assembly 62 is configured to dispense the treatment material 64 with a reduced air pressure (i.e., 5-20 psi (34.5-137.9 kPa)) such that the surface treatment layer 51 is applied in a non-atomized manner onto the wing surface 50 in a single pass.

In some embodiments, the surface treatment layer 51 is composed of a single surface coating and is dispensed in a single pass along the wing surface 50. However, additional passes may be performed to apply the surface treatment layer 51 along the wing surface 50, as needed. In one non-limiting example, the applicator assembly 62 is configured to apply a plurality of coatings that are combined to form the surface treatment layer 51, and the applicator assembly 62 is configured to dispense one coating at a time along the wing surface 50. As a result, the applicator assembly 62 makes one or more passes to dispense each of the plurality of coatings that comprise the surface treatment layer 51. Alternatively, two or more automated robot assemblies 58 and applicator assemblies 62 are configured to each apply a single coating as each of the two or more automated robot assemblies 58 and applicator assemblies 62 moves along the wing surface 50 to dispense the plurality of coatings that comprise the surface treatment layer 51.

Figure 5:
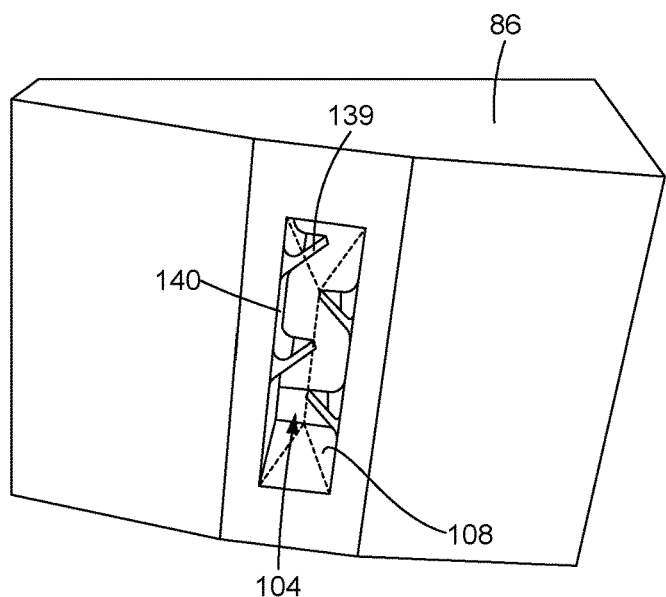
FIG. 5 is a perspective view of a portion of an exemplary applicator assembly of FIGS. 3-4, in accordance with the present disclosure.

Referring now to FIG. 5 and with continued reference to FIG. 4, an exemplary dispenser aperture 104 formed in the applicator clamp 86 is shown. In one non-limiting example, the dispenser aperture 104 is a rectangular opening which extends from the exterior into the interior space 100 of the applicator clamp 86. However, other geometries of the dispenser aperture 104 are possible, such as, but not limited to, a circular opening, a square opening, or other such shaped opening. As described above, in some embodiments the dispenser aperture 104 is configured to have the applicator tip 108 inserted into the dispenser aperture 104. As a result, the applicator tip 108 includes the interior portion 110 extending through the dispenser aperture 104 to an exterior portion 112 which protrudes exteriorly from the dispenser aperture 104. Furthermore, in some embodiments, one or more applicator tip holders 139 are arranged around a lateral surface 140 of the dispenser aperture 104 and configured to hold or position the applicator tip 108 within the dispenser aperture 104. In one non-limiting example, the one or more applicator tip holders 139 are formed or otherwise shaped to resemble "tooth-like" features configured to extend outwardly from the lateral surface 140 into the opening formed by the dispenser aperture 104. Therefore, when the applicator tip 108 is inserted into the dispenser aperture 104, the applicator tip holders 139 grip, hook or otherwise grasp the applicator tip 108 and hold the applicator tip 108 within the dispenser aperture 104. Furthermore, the applicator tip holders 139 are configured such that the applicator tip 108 is securely held within the dispenser aperture 104; however the applicator tip 108 can be removed from the dispenser aperture 104 and exchanged with a new or alternate type of applicator tip 108. Generally, the applicator tip 108 is formed out of an absorbent foam material, but can be made out of other material such as, rubber, polymer, composite, natural or synthetic fibers, plastic, and the like. Additionally, while the applicator tip holders 139 are shown as "tooth-like" projections, alternative holding devices such as clamps, clips, pins, and other such holding devices are possible.

Figure 6:
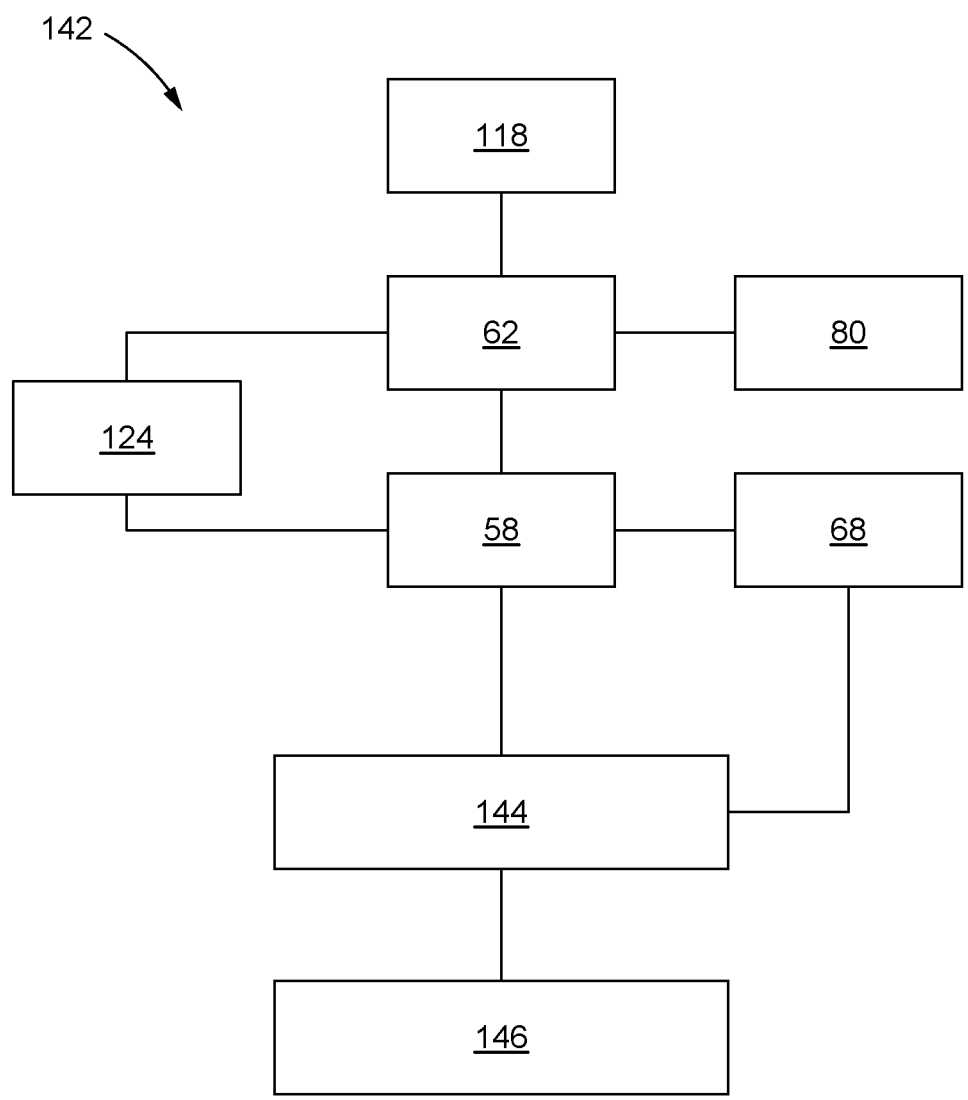
FIG. 6 is a schematic view of an exemplary surface treatment control system in accordance with the present disclosure.

Referring now to FIG. 6, a schematic of a surface treatment control system 142 is illustrated. The surface treatment control system 142 is configured to operate and monitor the automated robot assembly 58 and the applicator assembly 62. The surface treatment control system 142 includes a controller 144 and an input/output terminal 146 which is communicably coupled to the controller 144. Furthermore, the controller 144 is programmed to control the movement of the automated robot assembly 58, as well as, to control the movement and adjustment of the applicator assembly 62 operably attached to the automated robot assembly 58. For simplicity, FIG. 6 shows the controller 144 communicably coupled to a single automated robot assembly 58 and applicator assembly 62. However, in some embodiments, the controller 144 is configured to control and operate a plurality of automated robot assemblies 58 and applicator assemblies 62.

Referring back to FIG. 2 and with continued reference to FIG. 6, the controller 144, the input/output terminal 146 and other components of the surface treatment control system 142 are located in an operator control station 148 located in the work area 46. The surface treatment control system 142 is configured to control and operate one or more automated robot assemblies 58. In one non-limiting example, operator control station 148, which includes the controller 144 and the input/output terminal 146, is proximally located to the work area 46 and set up in a position adjacent to the wing 26 or other component to be treated. Moreover, the operator control station 148 is proximally located to the automated robot assembly 58 and other components of the surface treatment control system 142 such that the controller 144, and the input/output terminal 146 are in direct communication though a wired connection between the controller 144 and the automated robot assembly 58. Alternatively, communication between the controller 144, the input/output terminal 146, and the automated robot assembly 58 and other components of the surface treatment control system 142 is established using a wireless connection such as, but not limited to, a radio frequency network, a computer data network, a Wi-Fi data network, a cellular data network, a satellite data network, or any other known data communication network.

Additionally, the surface treatment control system 142 of FIG. 6 is configured to a user to access the controller 144 using the input/output terminal 146. In some embodiments, the input/output terminal 146 allows for commands and other instructions to be input through a keyboard, mouse, dial, button, touch screen, microphone, or other known input device. Furthermore, data and other information generated by the surface treatment control system 142 can be output to the input/output terminal 146 through a monitor, touch screen, speaker, printer, or other known user output device. In some embodiments, the input/output terminal 146 is communicably coupled to the controller 144 through a wired connection which directly connects the input/output terminal 146 to the controller 144. Alternatively, the input/output terminal 146 is communicably coupled to the controller 144 through a wireless communication network such as Bluetooth communication, near-field communication, a radio frequency network, a computer data network, a Wi-Fi data network, a cellular data network, a satellite data network or any other known data communication network.

Moreover, in one non-limiting example, the input/output terminal 146 is a mobile communication device that is communicably coupled to the controller 144, such as a laptop computer, a tablet computer, a smart phone device, a cellular phone, or other such mobile device. As a result, multiple users such as, an operator, an engineer, a technician, a supervisor, or other interested personnel can access the controller 144 and other components of the surface treatment control system 142. In some embodiments, each user can wirelessly access the controller 144 and other components of the surface treatment from a remote location (i.e., outside of the work area 46) to control and monitor the surface treatment control system 142. Such a configuration will provide flexibility to the users of the surface treatment control system 142 because they can be in an alternative location away from the work area 46 while monitoring and operating the surface treatment control system 142 during the treatment of the wing surface 50 or other desired surface to be treated.

In some embodiments, the controller 144 of the surface treatment control system 142 is composed of one or more computing devices that are capable of executing a control mechanism and/or software which allows the user to direct and control the automated robot assembly 58, the applicator assembly 62, or other component of the surface treatment control system 142. In some embodiments, the one or more computing devices of the controller 144 are programmed to control the movement of the surface treatment AGV 68, or other movement device. Additionally, the controller 144 is programmed to control the movement, operation and adjustment of the automated robot assembly 58 and the applicator assembly 62 during the application of the treatment material 64 on the wing surface 50. In one exemplary application of the surface treatment control system 142, the operator, or other user, is able to program a pattern or process for applying the treatment material 64. The pattern or process is transmitted from the controller 144 to the automated robot assembly 58 and the applicator assembly 62 and the pattern or process is executed by the automated robot assembly 58 and the applicator assembly 62 during the treatment of the wing surface 50 or other desired surface to be treated. Furthermore, the communication network establishes two-way communication between the surface treatment control system 142 and the automated robot assembly 58 such that data and information is easily sent and received. For example, commands sent by the surface treatment control system 142 are received by the automated robot assembly 58, and data collected by the automated robot assembly 58, the applicator assembly 62, and other such component is sent to and received by the controller 144.

In an embodiment, the one or more sensors 124 mounted on, or otherwise incorporated with, the automated robot assembly 58 and applicator assembly 62 is communicably coupled to the controller 144 and the input/output terminal 146. In one non-limiting example, the applicator assembly 62 attached to the automated robot assembly 58 includes at least one sensor 124. Additionally or alternatively, a plurality of sensors 124 is mounted on a variety of locations of the applicator assembly 62 and/or automated robot assembly 58. The data collected by the sensors 124 is transmitted to and utilized by the controller 144 and other components of the surface treatment control system 142. Additionally, in an embodiment, the controller 144 is programmed to store, analyze and extract information from the data collected by the sensors 124, and use the extracted information to program the control signals sent by the controller 144 to the automated robot assembly 58 and the applicator assembly 62. For example, the sensors 124 include a sensing device, such as, but not limited to, a vision sensor (i.e., camera), a laser scanning topography and surface height sense sensor (i.e., laser, LIDAR, and/or interferometer), and other such surface metrology sensors. Therefore, in some embodiments, data collected by the sensors 124 provides information about the wing surface 50 and other desired surface to be treated and the controller 144 programs the control signals based on the data collected by the sensors 124.

Additionally, in some embodiments, the controller 144 and the automated robot assembly 58 are operably coupled with one another to enable real-time adjustments to the automated robot assembly 58 and the applicator assembly 62. For example, the controller 144 receives and analyzes the data collected by the one or more sensors 124 mounted on, or otherwise incorporated with the automated robot assembly 58 and applicator assembly 62. Moreover, each sensor 124 is configured to detect a surface topography change in the wing surface 50, collect imaging and vision data of the wing surface 50, determine a height or dispense gap between the wing surface 50 and the applicator assembly 62, provide a topographical map of the wing surface 50, provide positioning and location data of the automated robot assembly 58, and provide any other such surface data collected. Furthermore, the controller 144 transmits a control signal or other such set of commands to the surface treatment AGV 68, the automated robot assembly 58, the applicator assembly 62 (i.e., treatment material control valve 80, applicator actuator 118, or other device) to make adjustments to the control and operation of the applicator assembly 62

Additionally, the user is able to view the data collected by the one or more sensors 124 on the input/output terminal 146 and, if necessary, input adjustments to the control signal commands sent from the controller 144 to the automated robot assembly 58 and/or applicator assembly 62. In some embodiments, the surface treatment control system 142 is capable of making real-time adjustments to the automated robot assembly 58, the applicator assembly 62 and other such components of the surface treatment control system 142 through the two-way communication link established by the surface treatment control system 142.

Figure 7:
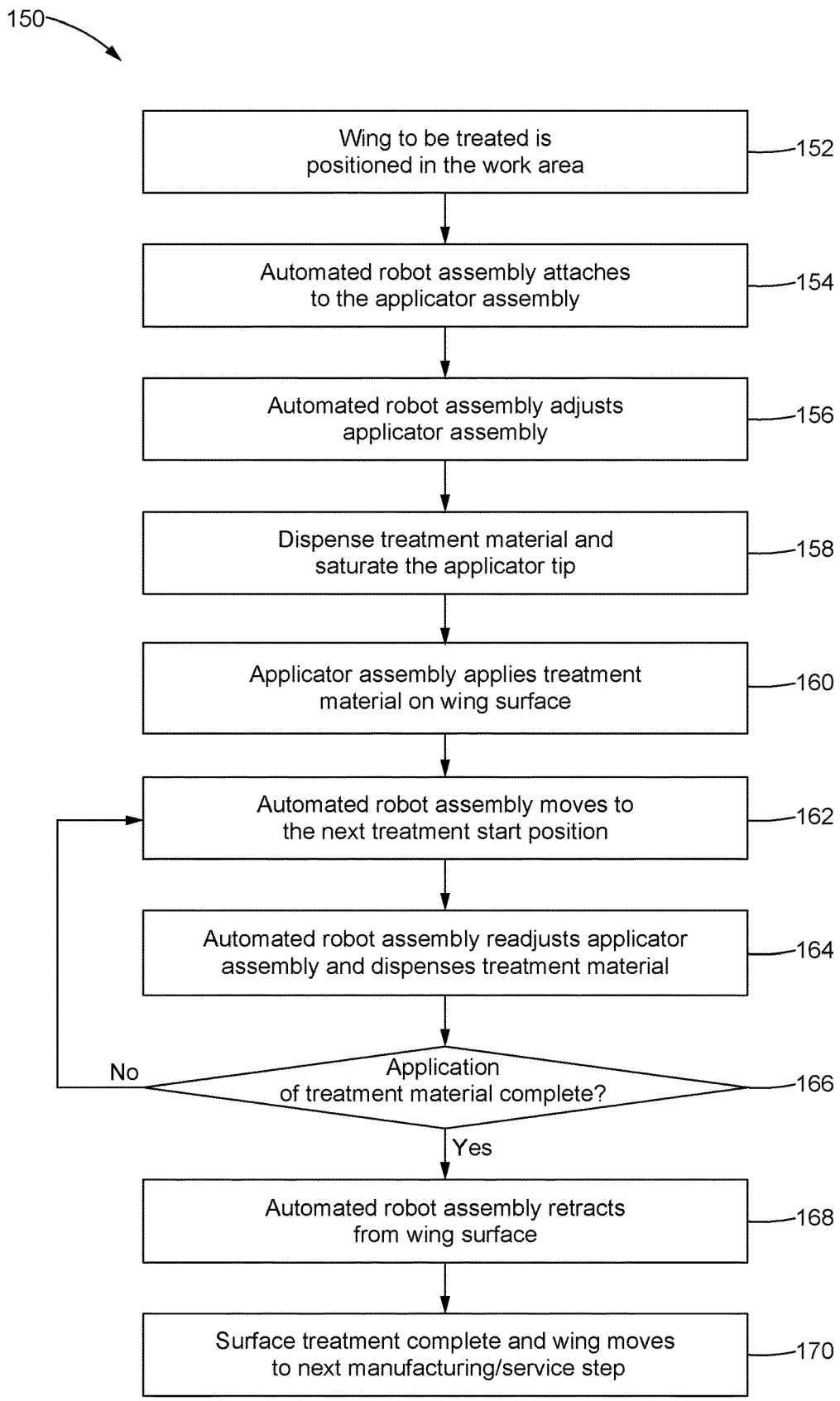
FIG. 7 is a flowchart illustrating an exemplary method of treating a surface in accordance with the present disclosure.

Referring now to FIG. 7, and with continued reference to the proceeding FIGS. 1-6, a flowchart illustrating an exemplary method or process 150 of treating a surface with a surface treatment system is illustrated. In a first block 152 of the surface treatment method or process 150, a structure such as a wing 26 or other component of the vehicle 20, is prepared for surface treatment and positioned within the work area 46. In one non-limiting example, the surface preparation includes the removal of any protective or previously applied coatings on the wing surface 50, abrading, cleaning, and drying the wing surface 50, and any other surface preparations needed prior to the treatment of the wing surface 50. Furthermore, prior to the start of the surface treatment method or process 150, the wing 26, or other vehicle 20 component, is moved into the treatment position within the work area 46. In one non-limiting example, the wing 26 is transported into the work area 46 by one or more AGVs 54 and delivered to the wing support structures 56, or other such support structures configured to support the wing 26 during treatment.

In a next block 154 of the surface treatment method or process 150, the automated robot assembly 58 moves to a surface treatment tool area located within the work area 46 and prepares to attach the desired applicator assembly 62 to the automated robot assembly 58. In one non-limiting example, the desired treatment material 64 is loaded into the pressure vessel 76 before the desired applicator assembly 62 is attached to the automated robot assembly 58. Alternatively, the desired treatment material 64 is loaded into the pressure vessel 76 after the applicator assembly 62 is attached to the automated robot assembly 58. Moreover, in some embodiments, the desired treatment material 64 is a dispensable material such as, but not limited to, paint, primer, base coat, top coat, clear coat, or other such material. However, the use of other types of material is possible. In one non-limiting example, the treatment material 64 is a viscous paint (i.e., viscosity of 100 centipoise or less) that is used to apply linear and/or curved markings and identifiers (i.e., "no-step" lines, "Caution," or "Hot") on the wing surface 50. Additionally, once the treatment material 64 is loaded into the pressure vessel 76, the pressure vessel 76 is pressurized to the desired dispense pressure. Generally, the desired dispense pressure falls within the range of 5 to 20 psi (34.5-137.9 kPa); however other pressures (i.e., higher or lower) are possible.

Once the applicator assembly 62 is loaded with treatment material 64, properly pressurized, and attached to the automated robot assembly 58, then according to a next block 156, the controller 144 sends a control signal to move and position the automated robot assembly 58 to the treatment start position on the wing surface 50. In some embodiments, prior to the application of the treatment material 64, an alignment and adjustment check is performed to confirm that the automated robot assembly 58, and more specifically, the applicator assembly 62 is properly adjusted and aligned relative to the wing surface 50. In some embodiments, the adjustment check includes analyzing data collected by the one or more sensors 124 to confirm the proper dispense gap is set between the wing surface 50 and the applicator assembly 62. Additionally, the adjustment check confirms that each applicator assembly 62 is in a normal or orthogonal orientation relative to the wing surface 50. Failure to properly adjust and align the applicator assembly 62 relative to the wing surface 50 may result in a non-uniform application of the treatment material 64, damage to the wing surface 50, or other such defects. Therefore, if the inspection fails the set of predetermined adjustment criteria (i.e., dispense gap, orientation) which are input into the controller 144, the automated robot assembly 58 and the applicator assembly 62 continue adjustment and alignment to correct any alignment and positioning errors.

After the automated robot assembly 58 and applicator assembly 62 are properly adjusted, in a next block 158 a control signal is sent from the controller 144 to activate (i.e., open) the treatment material control valve 80 such that the material applicator 74 begins dispensing the treatment material 64 to properly saturate the applicator tip 108 of the applicator assembly 62. In one non-limiting example, the controller 144 uses a predetermined time setting to properly saturate the applicator tip 108. Alternatively or additionally, a flow sensor or other monitoring device is used to determine the proper amount of treatment material 64 is being dispensed. In some embodiments, the operator, or other user, of the surface treatment control system 142 will be notified of the alignment errors, treatment material 64 saturation errors and other such errors prior to the start of treatment. As a result, the user is able to correct the adjustment and saturation of the applicator assembly 62 by inputting a corrective action command or other such instruction into the input/output terminal 146 which is then transmitted by the controller 144 to the automated robot assembly 58 and the applicator assembly 62.

Once the applicator tip 108 is saturated with treatment material 64, then in a next block 160 the applicator assembly 62 begins the first application of the treatment material 64 along the wing surface 50, or other desired surface to be treated. In one non-limiting example the automated robot assembly 58 and applicator assembly 62 are programmed to apply a straight line of treatment material 64 along the wing surface 50. As a result, the first application of the treatment material 64 begins at a first position and ends at a second position, and the treatment material 64 is applied to the wing surface 50 as the automated robot assembly 58 and applicator assembly 62 move between the first position and second position. Alternatively, in some embodiments, the automated robot assembly 58 and applicator assembly 62 are programmed to apply other patterns of treatment material 64 such as, but not limited to, a curved line, a dashed line, and/or other such pattern. Moreover, in yet another embodiment, the automated robot assembly 58 and applicator assembly 62 are programmed to apply a solid pattern of the treatment material 64 over a portion, or even the entire wing surface 50.

In a next block 162, as the automated robot assembly 58 and the applicator assembly 62 complete the first application of the treatment material 64, the controller 144 sends a signal to deactivate (i.e., close) the treatment material control valve 80 such that the dispensing of treatment material 64 stops. The automated robot assembly 58 and applicator assembly 62 then move to a different position on the wing surface 50 to prepare for a second or subsequent application of the treatment material 64.

In a next block 164, the automated robot assembly 58 and applicator assembly 62 go through the alignment and adjustment checks. Once the automated robot assembly 58 and applicator assembly 62 are properly aligned, the controller 144 sends a signal to activate (i.e., open) the treatment material control valve 80 such that the dispensing of the treatment material 64 restarts and the applicator assembly 62 begins the second or subsequent application of the treatment material 64 along the wing surface 50, or other desired surface to be treated. As a result, the second or subsequent application of the treatment material 64 begins at a subsequent first position and ends at a subsequent second position, and the treatment material 64 is applied to the wing surface 50 as the automated robot assembly 58 and applicator assembly 62 moves between the subsequent first position and second positions. In some embodiments, the sensors 124 attached to the automated robot assembly 58 and/or the applicator assembly 62 continue to scan and collect data of the wing surface 50 topography. The data collected by the sensors 124 is analyzed by the controller 144 to make real-time adjustments to the automated robot assembly 58 and the applicator assembly 62 as the applicator assembly 62 dispenses the treatment material 64 on the wing surface 50. For example, the controller 144 adjusts the applicator assembly 62 about the pivot joint 128 to maintain a normal or orthogonal orientation relative to the wing surface 50. Additionally, the controller 144 continues to analyze the surface topography data collected by the sensors 124 to maintain the proper dispense gap between the wing surface 50 and the applicator assembly 62 as the automated robot assembly 58 and applicator assembly 62 continues moving along the wing surface 50.

In a next block 166, upon the completion of the second or subsequent application of the treatment material 64, the controller 144 and other components of the surface treatment control system 142 determine whether an additional or subsequent application of treatment material 64 is needed along the wing surface 50. If the surface treatment control system 142 determines that additional or subsequent applications of the treatment material 64 are needed, then the surface treatment method or process 150 returns to block 162 for the subsequent application of treatment material 64. Alternatively, if the controller 144 and other components of the surface treatment control system 142 determine that the application of treatment material 64 is complete, then in a next block 168 the automated robot assembly 58 and applicator assembly 62 stop or end the application of treatment material 64 on the wing surface 50. In some embodiments, the automated robot assembly 58 and applicator assembly 62 retract from the wing surface 50 and return to the surface treatment tool area located within the work area 46. Moreover, the automated robot assembly 58 detaches the applicator assembly 62 and leaves the applicator assembly 62 at the surface treatment tool area to be cleaned and prepared for the next application of treatment material 64.

After all of the desired treatments or coatings of treatment material 64 have been applied to the wing surface 50, then in a next block 170, the surface treatment method or process 150 is determined to be complete and the wing 26 moves on to the next manufacturing or service step.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A method of treating a surface with a surface treatment system, the method comprising:
    determining a treatment start position of a robot arm for applying a treatment material to the surface, wherein an applicator assembly is attached to the robot arm and includes an applicator tip formed from an absorbent material;
    moving the robot arm to the treatment start position and aligning the applicator assembly with the surface;
    saturating the applicator tip with a material applicator configured to dispense the treatment material;
    manipulating the applicator assembly between a first position and a second position with an automated applicator actuator configured to position the applicator assembly relative to the surface; and
    selectively operating the applicator assembly to apply the treatment material to the surface;
    wherein the material applicator includes a dispensing end, and saturating the applicator tip comprises aligning the dispensing end with the applicator tip and positioning the dispensing end a fixed distance away from the applicator tip.

2. The method of claim 1, wherein the applicator assembly further comprises at least one sensor, and manipulating the applicator assembly comprises scanning the surface with the at least one sensor to produce a surface data set including a distance measured between the applicator assembly and the surface.

3. The method of claim 1, wherein the applicator assembly further comprises one or more surface engaging members attached to the applicator assembly, and manipulating the applicator assembly further includes engaging the one or more surface engaging members with the surface such that the applicator tip maintains a constant contact point at a fixed height relative to an application point of the applicator tip.

4. The method of claim 1, in which manipulating the applicator assembly further comprises rotating the applicator tip about an axis to maintain a predetermined orientation of the applicator assembly relative to the surface.

5. The method of claim 1, in which:
the applicator assembly includes an applicator clamp forming an interior space and having a dispensing aperture, the applicator clamp configured to support and position a dispensing end of the material applicator within the interior space; and
the applicator tip includes an interior portion and an exterior portion, the interior portion extending into the interior space and aligned with the material applicator such that the interior portion of the applicator tip absorbs the treatment material dispensed by the material applicator, and the exterior portion extending from the dispensing aperture to an exterior position, wherein the exterior portion selectively applies the treatment material along the surface to be treated.

6. The method of claim 5, in which the surface treatment system further includes a controller, and at least one sensor operatively attached to the applicator clamp and the controller, wherein the controller is communicably coupled to the automated applicator actuator and the at least one sensor, wherein the at least one sensor is configured to sense and scan the surface and produce a surface data set that includes a distance measured between the applicator clamp and the surface, and the controller is programmed to operate the automated applicator actuator to manipulate the applicator assembly based on the surface data set.

7. The method of claim 5, wherein the applicator clamp includes a raised lip formed within the interior space, the raised lip configured to surround a perimeter of the dispensing aperture to isolate the applicator tip from an excess of treatment material delivered by the material applicator.

8. A method of treating a surface with a surface treatment system, the method comprising:
determining a treatment start position of a robot arm for applying a treatment material to the surface, wherein an applicator assembly is coupled to the robot arm and includes:
an assembly support frame attached to the robot arm;
a material applicator configured to dispense the treatment material on the surface;
an applicator clamp forming an interior space and having a dispensing aperture, the applicator clamp configured to support and position a dispensing end of the material applicator within the interior space;
an applicator tip formed from an absorbent material and inserted into the dispensing aperture of the applicator clamp, the applicator tip extending from the interior space to a location exterior of the applicator clamp, the applicator tip configured to receive the treatment material from the dispensing end of the material applicator;
an applicator bracket attached to the material applicator and the applicator clamp, the applicator bracket configured to slidably attach the material applicator and the applicator bracket to the assembly support frame; and
an automated applicator actuator operatively attached to the assembly support frame and the applicator bracket;
moving the robot arm to the treatment start position and aligning the applicator assembly with the surface;
saturating the applicator tip with a material applicator configured to dispense the treatment material;
manipulating the applicator assembly between a first position and a second position with an automated applicator actuator configured to position the applicator assembly relative to the surface; and
selectively operating the applicator assembly to apply the treatment material to the surface.

9. The method of claim 8, in which the surface treatment system further includes:
at least one sensor operatively attached to the applicator assembly and configured to sense and scan the surface to produce a surface data set; and
a controller communicably coupled to the applicator assembly and programmed to operate the automated applicator actuator to manipulate the applicator assembly between at least the first position and the second position, and to selectively operate the material applicator such that the treatment material is applied to the surface.

10. The method of claim 9, in which the at least one sensor comprises a height sensor and the surface data set includes a distance measured between the applicator assembly and the surface, and in which manipulating the applicator assembly between the first position and the second position includes manipulating the applicator assembly based on the surface data set.

11. The method of claim 8, further comprising one or more surface engaging members attached to the applicator assembly, wherein when the applicator assembly is in the second position, the one or more surface engaging members are configured to engage the surface such that the applicator tip maintains a constant contact point at a fixed height relative to an application point of the applicator tip.

12. The method of claim 8, in which the dispensing end of the material applicator is aligned with the dispensing aperture of the applicator clamp, and the dispensing end is positioned a fixed distance away from the applicator tip.

13. The method of claim 8, in which the applicator clamp includes a raised lip formed within the interior space, the raised lip configured to surround a perimeter of the dispensing aperture to isolate the applicator tip from an excess treatment material delivered by the material applicator.

14. The method of claim 8, in which the dispensing aperture includes at least one applicator tip holder arranged around a lateral surface of the dispensing aperture, and wherein the at least one applicator tip holder is configured to securely hold the applicator tip within the dispensing aperture.

15. The method of claim 8, in which the applicator assembly further includes a pivot joint formed between the applicator bracket and the assembly support frame, and in which manipulating the applicator assembly between the first position and the second position further comprises rotating the applicator tip about an axis of the pivot joint to maintain a predetermined orientation of the applicator assembly relative to the surface.

16. A method of treating a surface with a surface treatment system, the method comprising:
determining a treatment start position of a robot arm for applying a treatment material to the surface, wherein an applicator assembly is attached to the robot arm and includes an applicator tip formed from an absorbent material;
moving the robot arm to the treatment start position and aligning the applicator assembly with the surface;
saturating the applicator tip with a material applicator configured to dispense the treatment material;
manipulating the applicator assembly with an automated applicator actuator configured to position the applicator assembly relative to the surface by:
moving the applicator assembly between a first position and a second position; and
as the applicator assembly is moved between the first position and the second position, selectively rotating the applicator tip about an axis to maintain a predetermined orientation of the applicator assembly relative to the surface; and
selectively operating the applicator assembly to apply the treatment material to the surface;
wherein the material applicator includes a dispensing end, and saturating the applicator tip comprises aligning the dispensing end with the applicator tip and positioning the dispensing end a fixed distance away from the applicator tip.

17. The method of claim 16, wherein the applicator assembly further comprises at least one sensor, and manipulating the applicator assembly comprises scanning the surface with the at least one sensor to produce a surface data set including a distance measured between the applicator assembly and the surface.

18. The method of claim 16, wherein the applicator assembly further comprises one or more surface engaging members attached to the applicator assembly, and manipulating the applicator assembly further includes engaging the one or more surface engaging members with the surface such that the applicator tip maintains a constant contact point at a fixed height relative to an application point of the applicator tip.

19. The method of claim 16, in which:
the applicator assembly includes an applicator clamp forming an interior space and having a dispensing aperture, the applicator clamp configured to support and position the dispensing end of the material applicator within the interior space; and
the applicator tip includes an interior portion and an exterior portion, the interior portion extending into the interior space and aligned with the material applicator such that the interior portion of the applicator tip absorbs the treatment material dispensed by the material applicator, and the exterior portion extending from the dispensing aperture to an exterior position, wherein the exterior portion selectively applies the treatment material along the surface to be treated.

20. The method of claim 19, in which the surface treatment system further includes a controller, and at least one sensor operatively attached to the applicator clamp and the controller, wherein the controller is communicably coupled to the automated applicator actuator and the at least one sensor, wherein the at least one sensor is configured to sense and scan the surface and produce a surface data set that includes a distance measured between the applicator clamp and the surface, and the controller is programmed to operate the automated applicator actuator to manipulate the applicator assembly based on the surface data set.

* * * * *